April 23, 1929.  A. M. KENNEDY  1,710,225
AEROPLANE
Filed March 22, 1928   2 Sheets-Sheet 2
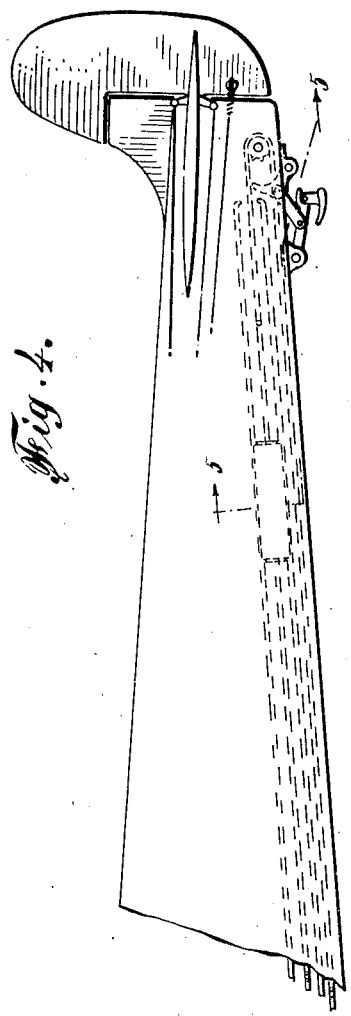
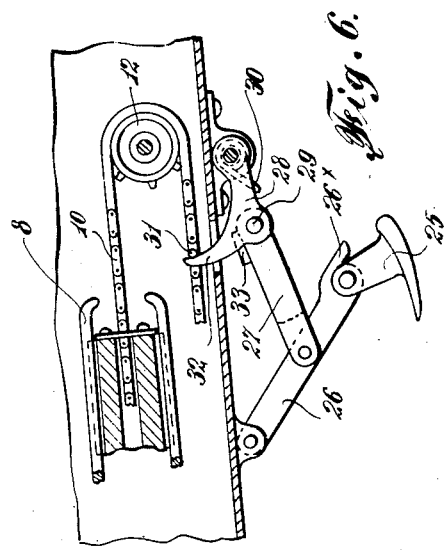
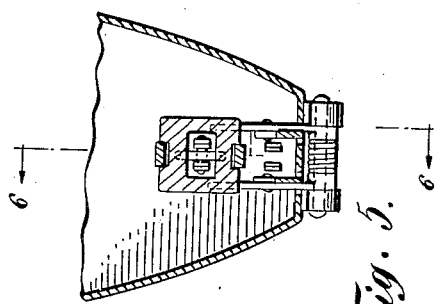
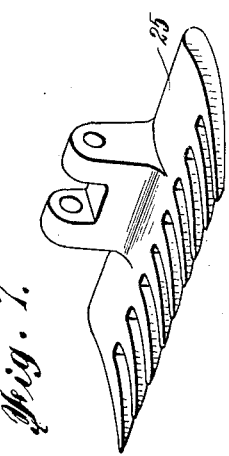

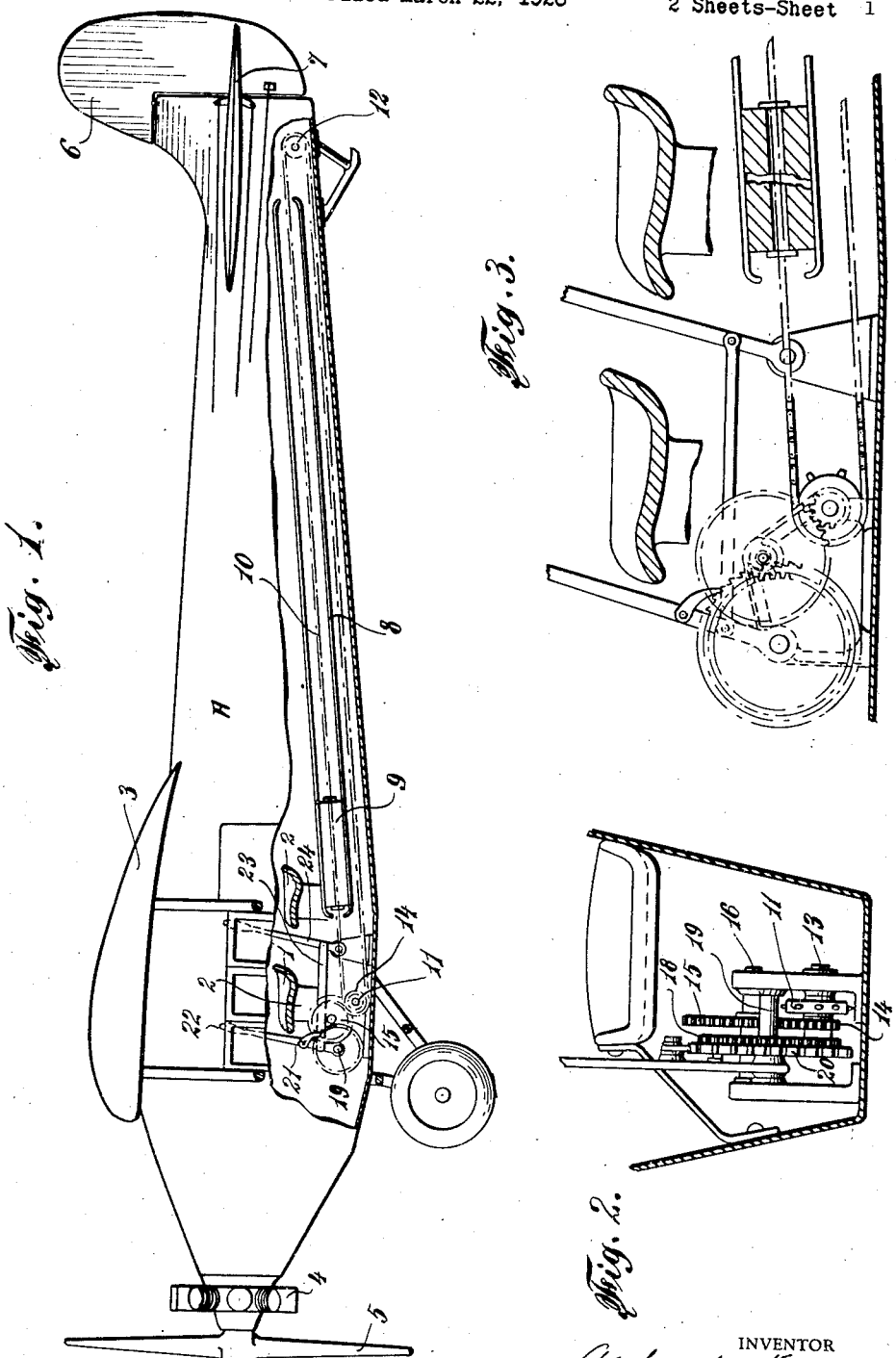

Patented Apr. 23, 1929.

1,710,225

UNITED STATES PATENT OFFICE.

AUBREY M. KENNEDY, OF NEW YORK, N. Y.

AEROPLANE.

Application filed March 22, 1928. Serial No. 263,677.

The object of the present invention is to provide means for stabilizing aeroplanes for use particularly during landing, and to prevent the tendency of planes in landing to nose-down, and to also offset the tendency of planes landing on wet, muddy or uneven fields to nose over. The invention comprises a counter-weight combined with mechanism for carrying the same back along the fuselage toward the tail of the plane, and in one form it combines with the counter-weight mechanism a brake device which is thrown into action simultaneously with the movement of the counter-weight to the tail end of the plane and coacts therewith to stabilize the plane after the latter reaches the grounds.

The invention will be understood by reference to the accompanying drawings in which—

Figure 1 is a side elevation of an aeroplane, with the fuselage partly broken away to show an embodiment of the invention;

Figure 2 is an enlarged sectional elevation on the line 2—2, Figure 1;

Figure 3 is an enlarged side elevation of certain members of the embodiment illustrated in the drawings;

Figure 4 is a fragmentary enlarged side elevation showing the tail of the aeroplane, certain members being shown in dotted lines, and Figure 5 is an enlarged transverse section on the line 5—5, Figure 4;

Figure 6 is a fragmentary longitudinal section on the line 6—6, Figure 5;

Figure 7 is a perspective view of a suitable form of harrow-brake.

In the drawings I have shown a conventional form of aeroplane comprising a fuselage A, pilot seats 1, 2, wing 3, radial engine 4, propeller 5, rudder 6, and ailerons 7. Within and running longitudinally of the fuselage, ending at the tail of the aeroplane, is a guide-way 8 of any suitable construction and adapted to receive and guide a counter-weight 9. In the present instance the counter-weight is carried by a sprocket chain 10 led over a front sprocket wheel 11 and rear sprocket wheel 12. Sprocket wheel 12 is carried on a shaft 13 which also carries a gear wheel 14 in mesh with a larger gear 15 on a shaft 16. Shaft 16 carries a small pinion 17 in mesh with a large gear wheel 18 on a shaft 19. Gear 18 lies adjacent a ratchet wheel 20 which is either connected to the gear or to shaft 19, which latter is actuated by a pawl 21 on hand lever 22. Hand lever 22 is connected by link 23 to a hand lever 24 so that pawl 21 may be actuated from seat 1 or seat 2.

Reciprocation of lever 22 or lever 23 or both will, through the speed increasing mechanism thus above described, impart rapid rotation to sprocket wheel 11 and chain 10 will be driven in such manner as to carry the counter-weight 9 to the rear end of the fuselage. By any simple reversing device, as for example by swinging the pawl over the opposite side of lever 22 and making the teeth of the ratchet wheel 20 tapered on opposite sides, reciprocation of the lever will cause a return movement of the chain and the counter-weight carried thereby.

At the tail of the fuselage I have provided a brake comprising the brake shoe 25 which may be of the form illustrated in Figure 7. The brake shoe is pivoted on a link-arm 26 and acts against a stop $26^x$. The brake is thrown into action by a toggle comprising front link 27 and rear link 28 mutually pivoted at 29. Rear toggle member 28 is engaged by a spring 30 which tends to move the toggle toward broken position. The toggle is moved to operative position through a contact stud 31 carried by chain 10 which is adapted to come into engagement with an upwardly projecting arm 32 of toggle member 28, the toggle being straightened thereby and stop 33 limiting further movement. When stud 31 is retracted from member 32, spring 30 breaks the toggle. The arrangement is such that the brake is raised clear of the ground.

It will be understood that various modifications may be made in the drawings without departing from the spirit of the invention. For example, the use of a pawl and ratchet wheel can be eliminated by so proportioning gear 18 and the gears intermediate the same and shaft 13, that the movement of lever 22 as far forward as it will go, or as far rearward as it will go, according to the direction of rotation of the gears, will carry the counter-weight to the tail of the fuselage, a reverse movement restoring it to initial position by a single movement of the lever.

To change the centre of gravity of the aeroplane simply requires the adjustment of the counter-weight, backwards or forwards. This is a great advantage in maneuvering in the air, in adjusting the balance of the machine to take care of fuel consumed, passengers carried, freight delivered, bombs dropped, etc.

Landing is one of the most delicate maneuvers to accomplish in flying. It is essential when landing that the machine or plane modify its line of flight until it is tangent with the ground and tail down. With the invention the position of the tail and the consequent tangent of the machine is positively controlled by the position of the counter-weight as related to the centre of gravity of the plane. The further back the counter-weight toward the tail, the lower the tail of the plane.

With the invention brakes can be safely placed on the wheels of the landing gear, these brakes to be as strong as desired. It has been impossible to safely brake an aeroplane heretofore on account of the danger of nosing over as above explained. This will enable the plane to stop in a very small field as compared with the fields now required.

Having described my invention what I claim and desire to secure by Letters Patent is as follows:—

1. In an aeroplane, in combination, a fuselage, propelling means including an engine, maneuvering means, a counter-weight carried by and movable longitudinally of the fuselage, a brake carried by the fuselage near its tail, and means for simultaneously actuating the counter-weight and positioning the brake.

2. In devices of the character described, a fuselage, a counter-weight movable longitudinally of the fuselage, an actuator for the counter-weight, a brake including a toggle and means carried by the actuator for straightening the toggle thereby placing the brake in operative position for coaction with the counter-weight to resist nosing over of the aeroplane on landing.

In testimony whereof, I have signed my name to this specification.

AUBREY M. KENNEDY.